(12) United States Patent
Koch

(10) Patent No.: US 9,474,200 B2
(45) Date of Patent: Oct. 25, 2016

(54) AGRICULTURAL TOOLBAR LINE ROUTING SYSTEMS AND METHODS

(71) Applicant: PRECISION PLANTING LLC, Tremont, IL (US)

(72) Inventor: Dale Koch, Tremont, IL (US)

(73) Assignee: Precision Planting LLC, Tremont, IL (US)

(*) Notice: Subject to any disclaimer, the term of this patent is extended or adjusted under 35 U.S.C. 154(b) by 0 days.

(21) Appl. No.: 14/653,169

(22) PCT Filed: Dec. 17, 2013

(86) PCT No.: PCT/US2013/075804
§ 371 (c)(1),
(2) Date: Jun. 17, 2015

(87) PCT Pub. No.: WO2014/100002
PCT Pub. Date: Jun. 26, 2014

(65) Prior Publication Data
US 2015/0327429 A1 Nov. 19, 2015

Related U.S. Application Data

(60) Provisional application No. 61/738,313, filed on Dec. 17, 2012.

(51) Int. Cl.
*A01B 73/00* (2006.01)
*A01B 76/00* (2006.01)
*A01B 73/06* (2006.01)

(52) U.S. Cl.
CPC ............ *A01B 76/00* (2013.01); *A01B 73/065* (2013.01)

(58) Field of Classification Search
CPC .. A01B 29/04; A01B 63/008; A01B 63/006; A01B 63/16; A01B 63/32; A01B 73/00; A01B 73/02; A01B 73/065; A01B 73/067; A01B 73/044; A01B 76/00; A01C 7/208
USPC ............ 172/1, 311, 456, 466, 677; 280/412, 280/413, 491.2, 656
See application file for complete search history.

(56) References Cited

U.S. PATENT DOCUMENTS

| | | | | |
|---|---|---|---|---|
| 3,791,673 A | * | 2/1974 | Hornung | A01B 73/02 172/311 |
| 4,137,852 A | * | 2/1979 | Pratt | A01C 7/208 111/57 |
| 4,171,022 A | * | 10/1979 | Applequist | A01B 73/065 172/311 |
| 4,319,643 A | * | 3/1982 | Carter | A01B 73/065 172/311 |
| 5,113,956 A | * | 5/1992 | Friesen | A01B 73/065 172/311 |
| 5,232,054 A | * | 8/1993 | Van Blaricon | A01B 73/065 172/311 |
| 5,484,025 A | * | 1/1996 | Landphair | A01B 73/065 172/126 |
| 5,488,996 A | * | 2/1996 | Barry | A01B 73/065 172/311 |
| 2001/0051072 A1 | * | 12/2001 | Eckart | F16L 3/1033 403/344 |
| 2005/0087350 A1 | * | 4/2005 | Bauer | A01C 7/208 172/311 |
| 2006/0042809 A1 | * | 3/2006 | Neufeld | A01B 73/005 172/776 |
| 2014/0041885 A1 | * | 2/2014 | Grollmes | A01B 69/024 172/126 |

* cited by examiner

*Primary Examiner* — Robert Pezzuto
(74) *Attorney, Agent, or Firm* — Thomas J. Oppold; Larkin Hoffman Daly & Lindgren, Ltd.

(57) ABSTRACT

A toolbar is provided having a field position and a transport position. The toolbar includes a first bar section and a second bar section. A flexible line is retained partially adjacent to a pin pivotally joining the first bar section and the second bar section. The flexible line folds from the transport position to the working position.

17 Claims, 10 Drawing Sheets

AGRICULTURAL TOOLBAR LINE ROUTING SYSTEMS AND METHODS

BACKGROUND

In recent years, the increasing size of farms and farm operations has led to a demand for wider toolbars. Such toolbars are preferably configurable between a working or "field" position and a transport position so that the toolbar may be transported over the road without loading onto a trailer or other transport means. However, the routing of hydraulic, electrical, and other lines supported by the toolbar becomes complex when the toolbar must support those lines in both positions and transition between the positions without damaging or pinching the lines, preferably without any line adjustment by the user other than folding the toolbar itself. Thus there is a need in the art for agricultural toolbar line routing systems and apparatus for effectively supporting lines on a toolbar in a range of toolbar configurations between and including working and transport positions.

DESCRIPTION

Figure 1:
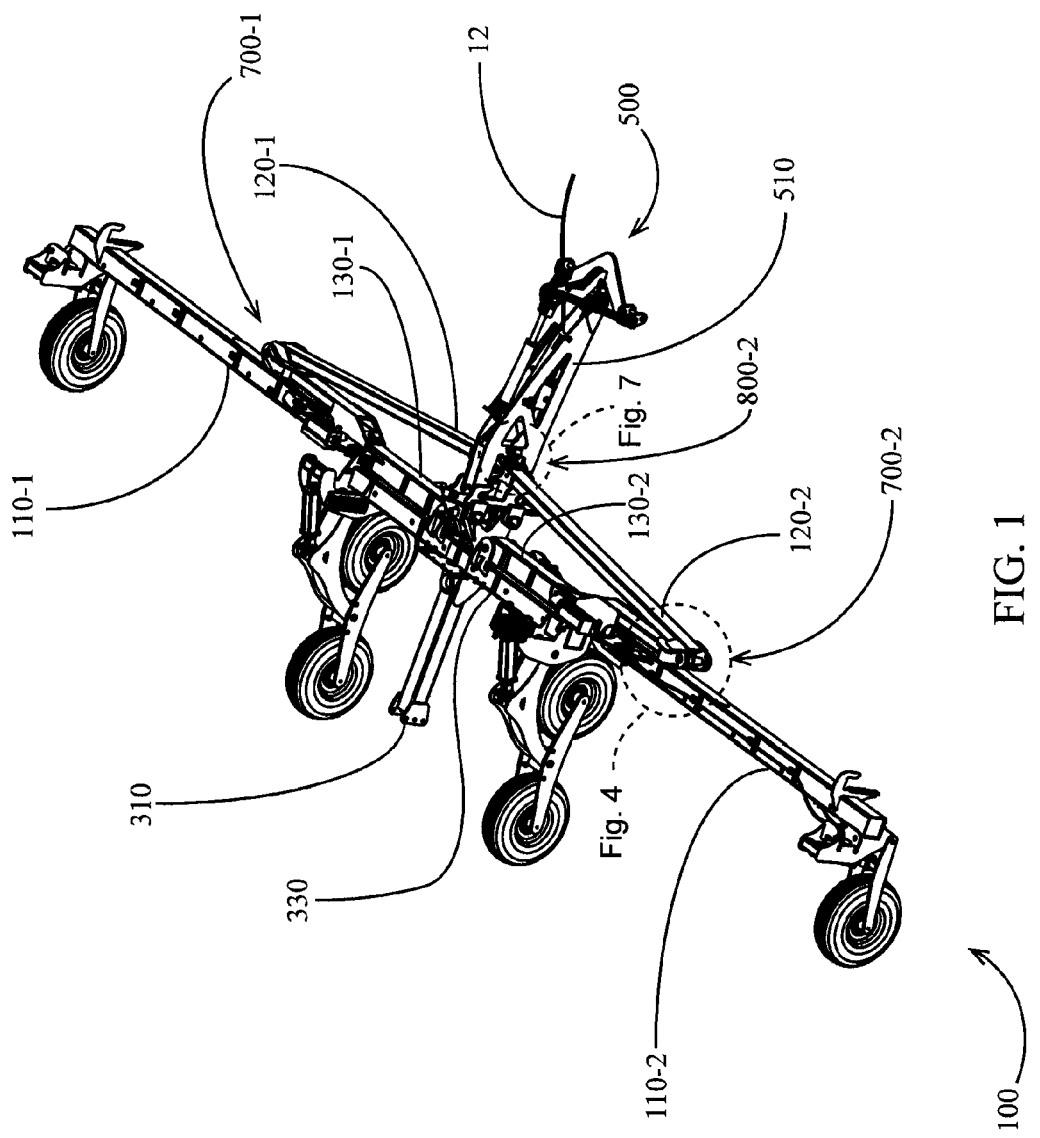
FIG. 1 is front perspective view of an embodiment of an agricultural toolbar in a field position.
Figure 2:
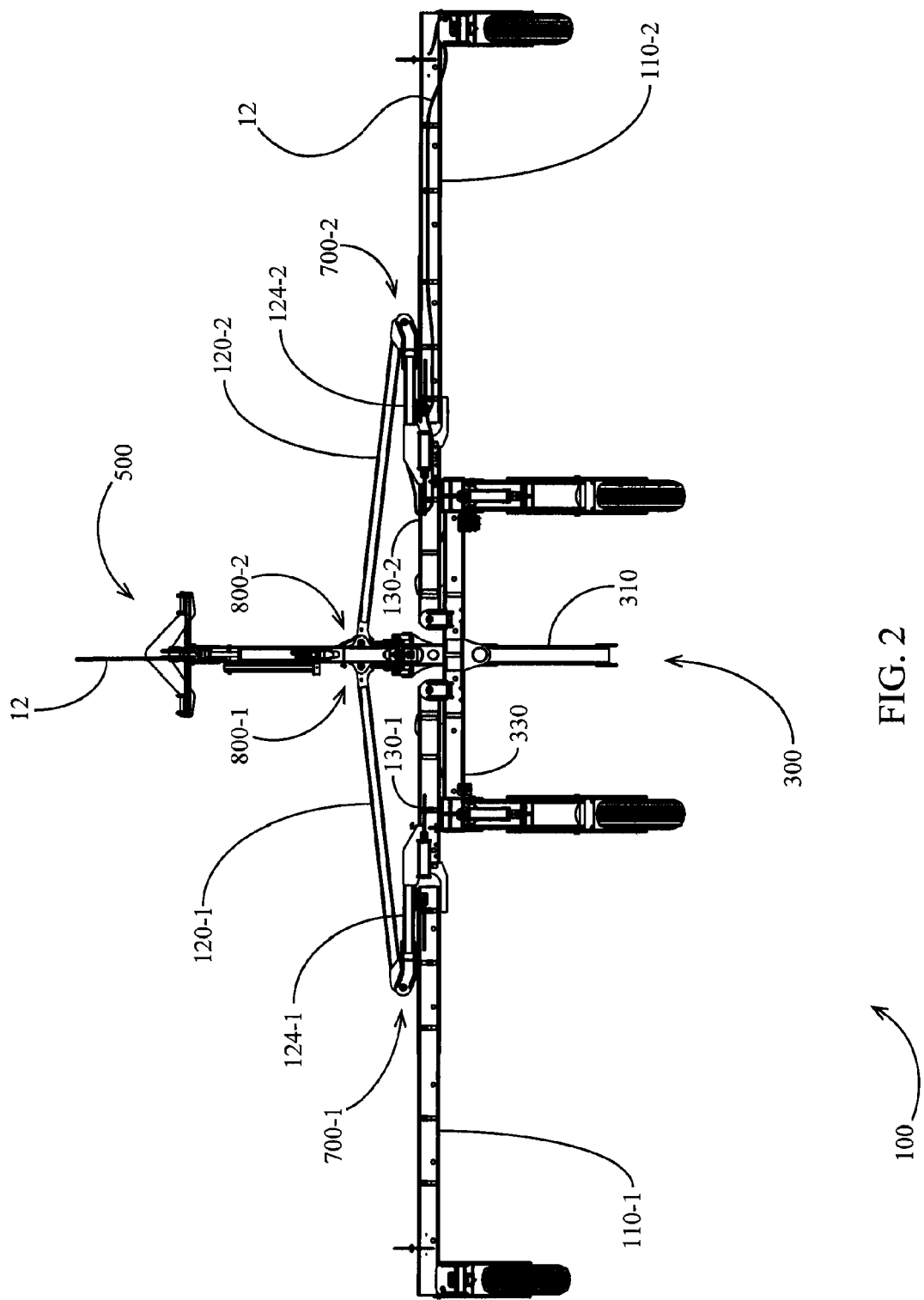
FIG. 2 is a top plan view of the toolbar of FIG. 1.

Referring now to the drawings, wherein like reference numerals designate identical or corresponding parts throughout the several views, FIGS. 1-2 illustrate an embodiment of an agricultural toolbar 100. The toolbar 100 is preferably similar to that disclosed in Applicant's co-pending U.S. Provisional Patent Application No. 61/590,643, the disclosure of which is incorporated herein in its entirety by reference. The toolbar 100 is coupled to a tractor (not shown) by a hitch and weight transfer assembly 500. The hitch and weight transfer assembly 500 preferably includes a longitudinally extending hitch portion 510. The hitch portion 510 is pivotally connected to draft tubes 120-1, 120-2 at draft tube joints 800-1, 800-2, respectively, for relative motion about a substantially vertical axis. The draft tubes 120 are pivotally coupled to doglegs 124 at dogleg joints 700 for relative motion about a substantially vertical axis. Doglegs 124 are coupled to inner wing sections 130. The inner wing sections 130 are pivotally coupled to outer wing sections 110 for relative motion about a substantially horizontal axis. The inner wing sections 130 are pivotally coupled to a center bar 330 by pins 334 for relative motion about a substantially vertical axis. A center section 300 includes the center bar 330 and an attachment tube 310 coupled to the center bar 330.

Figure 3:
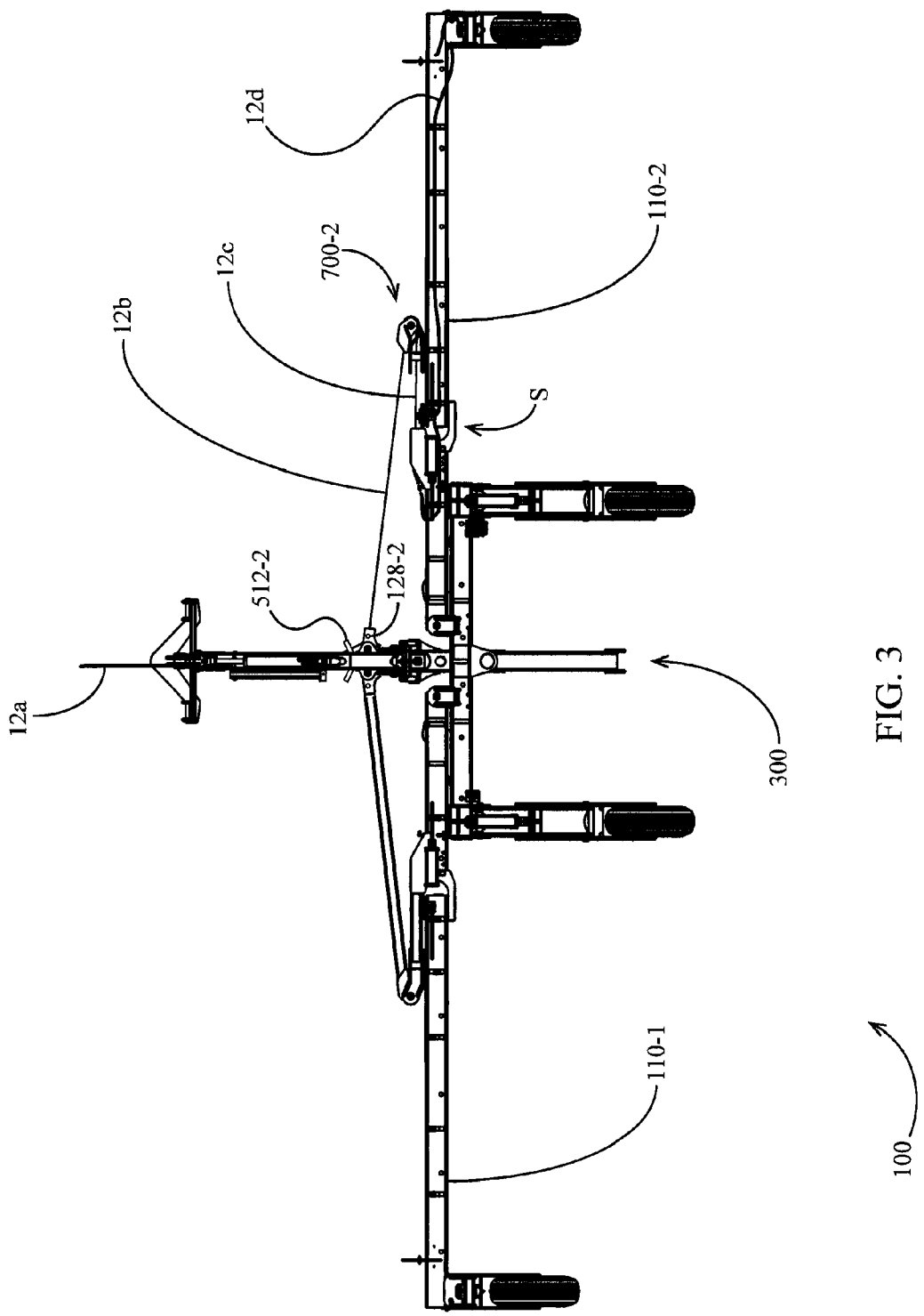
FIG. 3 is a top plan view of the toolbar of FIG. 1 with certain components removed for clarity.

Continuing to refer to FIGS. 1-2, a single line 12 is illustrated supported on the toolbar 100. It should be appreciated that the term "line" as used herein may refer to any flexible line including (without limitation) electrical leads, wiring harnesses, and hydraulic hoses. Turning to FIG. 3, the right draft tube 120-2 and the right dogleg 124-2 are removed to better illustrate the line 12. The line 12 preferably includes a first line portion 12a extending generally forwardly inside the hitch portion and extending toward the tractor to a connection point (e.g., an oil supply or electrical connection). The first line portion 12a is preferably constrained at a rearward end by a clamp 512-2. The line 12 also preferably includes a second line portion 12b extending rearward of a line guide pin 128-2 toward the dogleg joint 700-2. The second line portion 12b preferably extends inside the draft tube 120-2. The line 12 also preferably includes a third line portion 12c extending to the left of the dogleg joint 700-2. The third line portion 12c preferably extends inside the dogleg 124-2. The line 12 also preferably includes a fourth line portion 12d supported by the inner wing section 130-2 and the outer wing section 110-2. The fourth line portion 12d preferably includes sufficient slack length (at a location generally indicated by reference character S in FIG. 3) to permit the inner and outer wing sections 130,110 to rotate or "flex" relative to one another about a generally horizontal axis.

Figure 4:
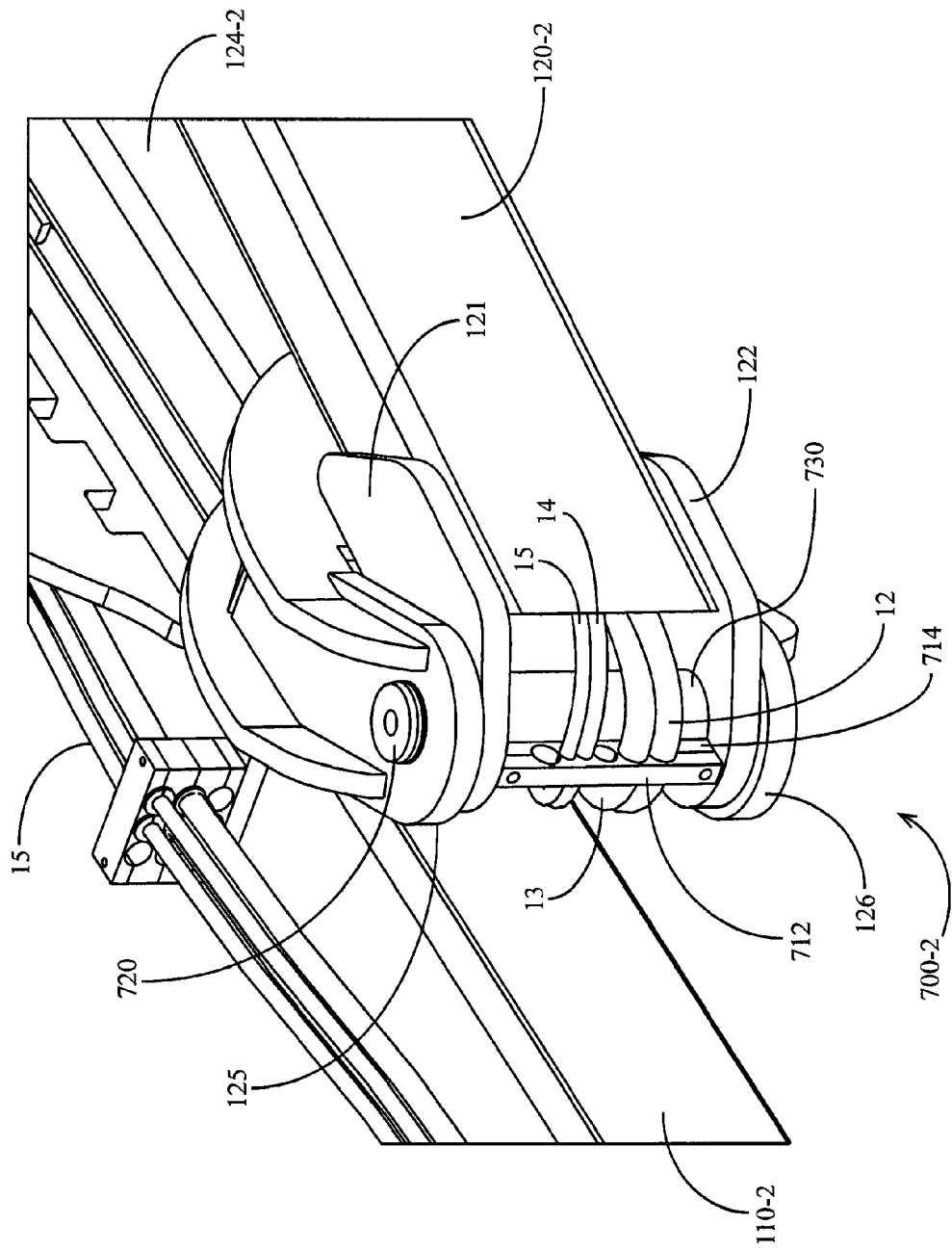
FIG. 4 is an enlarged view of an embodiment of the dogleg joint circled in FIG. 1.
Figure 5:
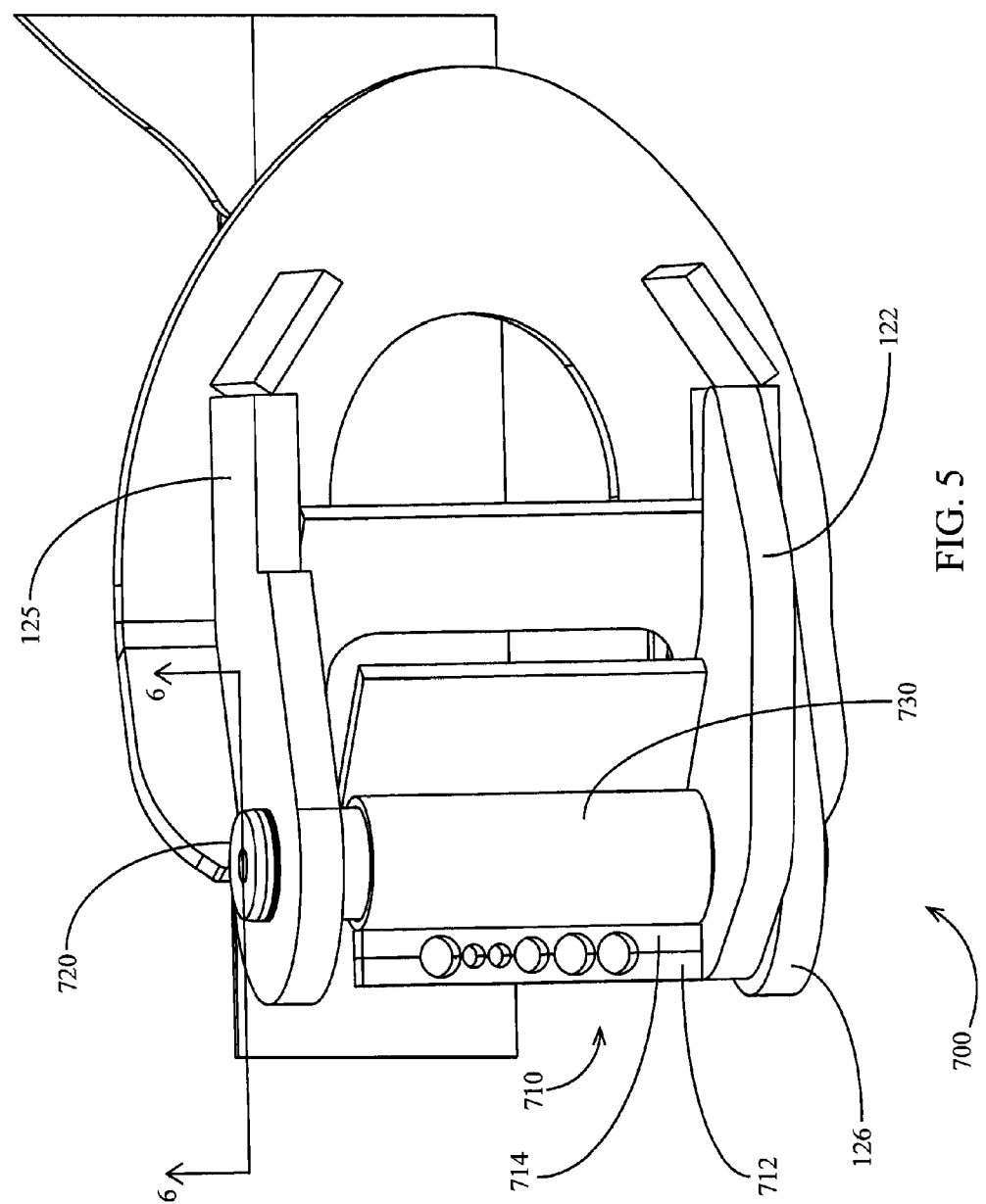
FIG. 5 is another perspective view of the dogleg joint of FIG. 4 with certain components removed for clarity.
Figure 6:
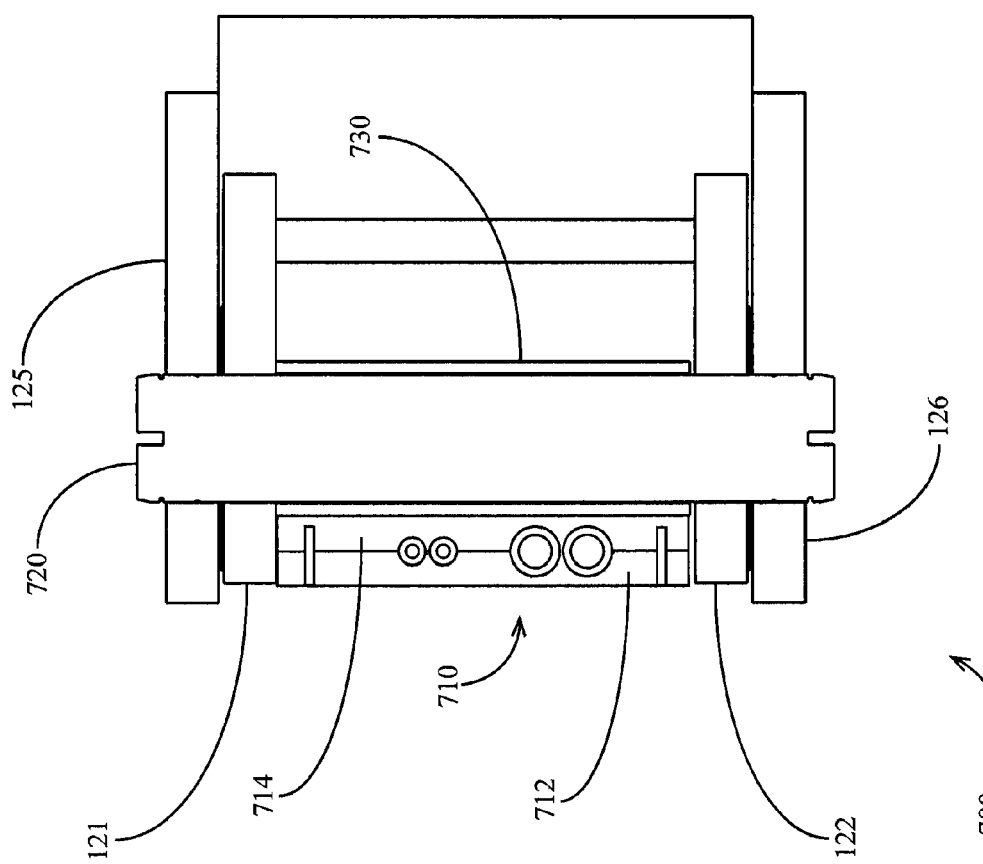
FIG. 6 is a cross-sectional view of the joint as viewed along the section 6-6 of FIG. 5.

Turning to FIGS. 4-6, the line 12, along with additional lines 13, 14, 15, is shown extending to the right of the dogleg joint 700-2. Each joint 700 preferably includes a pin 720. The pin 720 preferably extends through plates 125, 126 mounted to the dogleg 124. The pin 720 also preferably extends through plates 121,122 mounted to the draft tube 120. Thus, it should be appreciated that the dogleg 124 is pivotally coupled to the draft tube 120 by the pin 720 for relative rotation about a central longitudinal axis of the vertical pin 720. The lines 12, 13, 14, 15 preferably extend through holes provided in a clamp 710. The clamp 710 is preferably comprised of an outer portion 712 and an inner portion 714. The outer and inner portions 712, 714 are preferably secured together by bolts (not shown) in order to constrain the lines 12, 13, 14, 15 such that the lines are prevented from sliding through holes provided in the clamp 710. The holes in the clamp 710 are preferably sized to receive and constrain the lines.

Referring to FIG. 6, the inner portion 714 of the clamp 710 is preferably welded to a sleeve 730. The pin 720 is preferably slidably housed within sleeve 730 by a loose clearance fit. Thus, as the toolbar 100 folds as described below, the clamp 710 is free to rotate about a substantially vertical axis defined by the pin 720.

Figure 7:
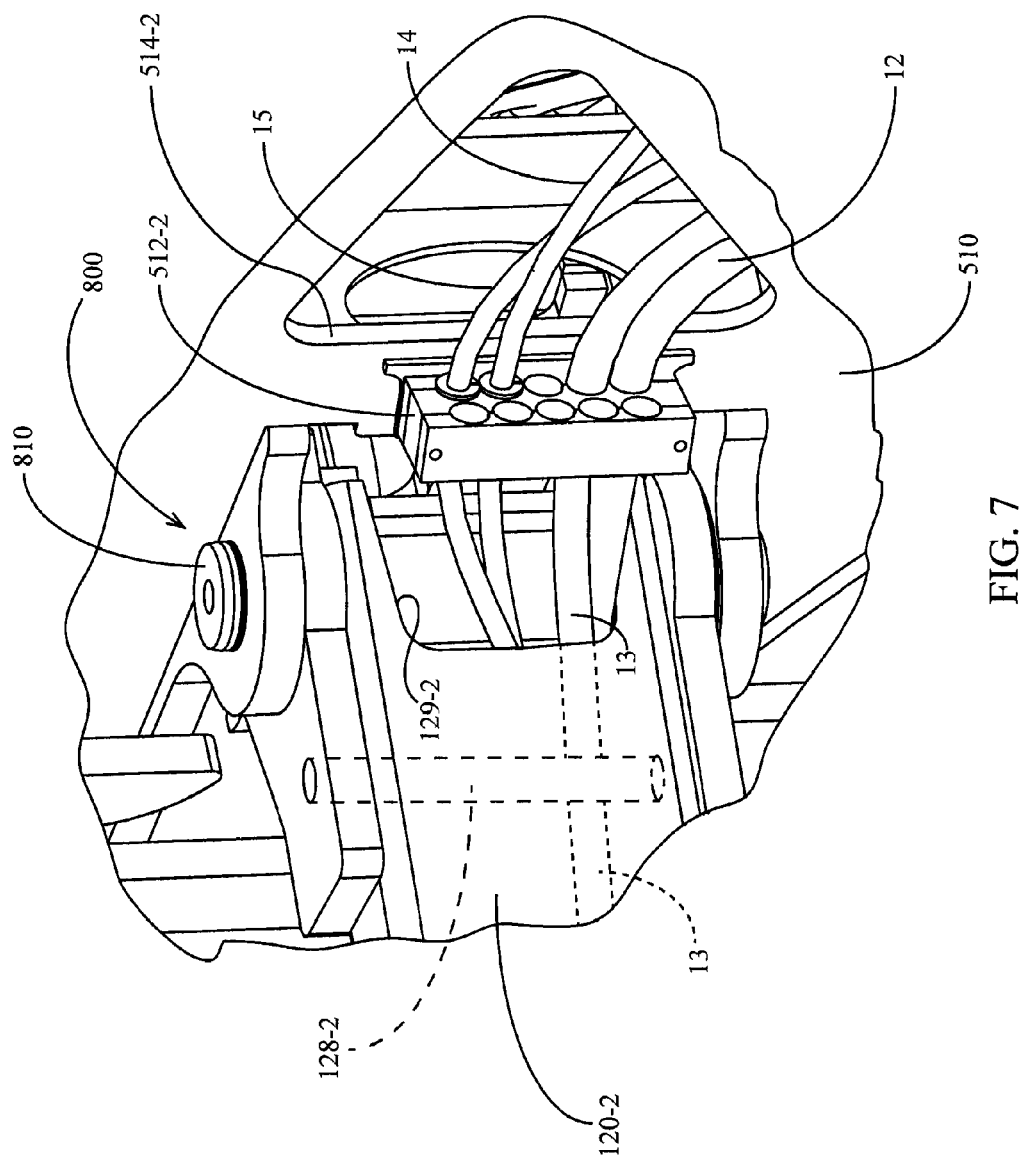
FIG. 7 is an enlarged perspective view of the draft tube joint circled in FIG. 1.

Turning to FIG. 7, the lines 12, 13, 14, 15 are illustrated at a location where they enter the draft tube 120 through an opening 129 in the draft tube adjacent the draft tube joint 800. The draft tube joint 800 includes a pin 810 pivotally coupling the draft tube 120 to the hitch portion 510 for relative rotation about a longitudinal axis of the vertical pin 810. The lines 12, 13, 14, 15 preferably extend between the pin 810 and the line guide pin 128. The line guide pin 128 is preferably vertically disposed within the draft tube 120. Forward of the opening 129, the lines 12, 13, 14, 15 pass through holes in a clamp 512. The line guide pin 128 is preferably positioned to prevent the lines 12, 13, 14, 15 from contacting an edge of the opening 129. The clamp 512 is mounted to the hitch portion 510. Similar to the clamp 710, the clamp 512 preferably includes an inner and outer portion defining holes sized to constrain the lines 12, 13, 14, 15 when the inner and outer portions of the clamp 512 are joined together (e.g., by bolts). Forward of the clamp 512, the lines 12, 13, 14, 15 enter an opening 514 in the hitch portion 510.

Figure 8:
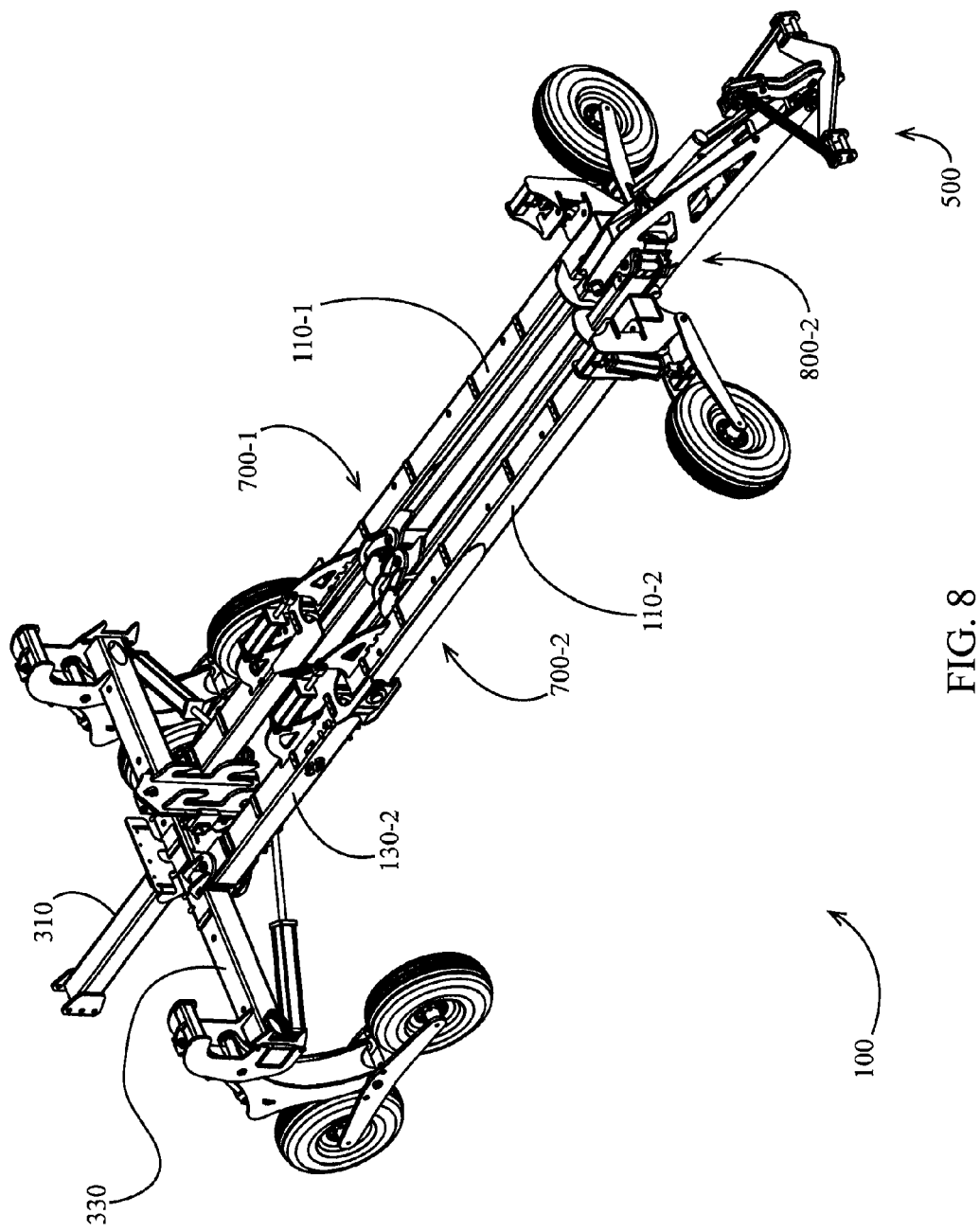
FIG. 8 is a front perspective view of the toolbar of FIG. 1 in a transport position.
Figure 9:
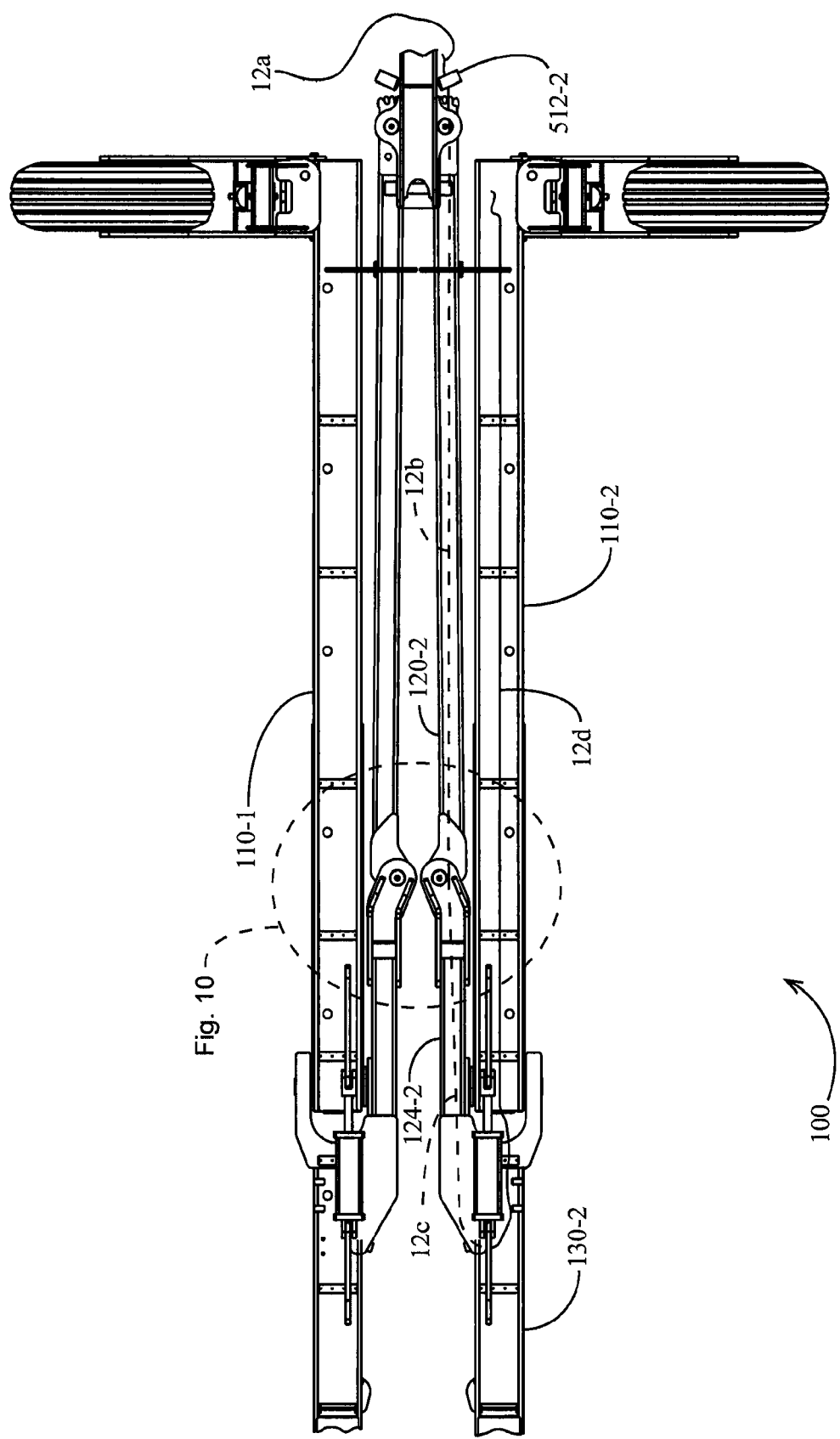
FIG. 9 is an enlarged top plan view of a portion of the toolbar illustrated in FIG. 8.
Figure 10:
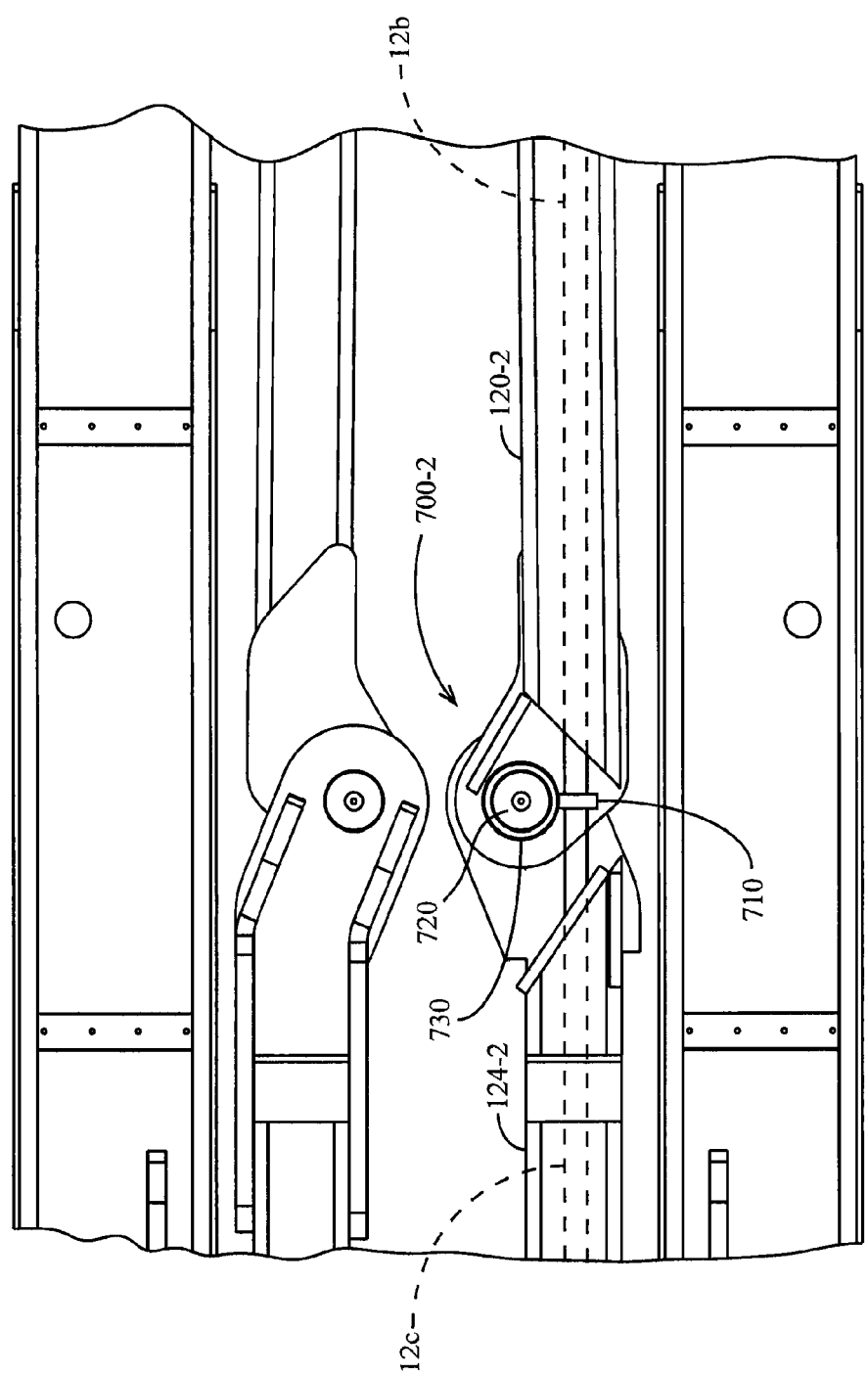
FIG. 10 is an enlarged view of the dogleg joints circled in FIG. 9.

In FIGS. 1 and 2 the toolbar 100 is illustrated in the unfolded field position, whereas in FIGS. 8, 9 and 10, the toolbar 100 is illustrated in the folded transport position. In the unfolded field position (FIGS. 1 and 2), the inner wing sections 130 and outer wing sections 110 are in substantial alignment with the center bar 330 and the draft tubes 120 are in a generally transverse position. As the toolbar folds from the field position to the transport position (FIGS. 8, 9, 10), the inner and outer wing sections 130, 110 rotate forward and away from the center section 300, while the draft tubes 120 translate forward and rotate such that the inner ends of the draft tubes 120 move generally forward while the distal ends of the draft tube 120 move both inward and forward. Once the toolbar is in the folded transport position, the inner and outer wing sections 130, 110 are substantially perpendicular to the center bar 330 and the draft tubes 120 are in a generally longitudinal position.

As the toolbar 100 folds from the field position to the transport position, the clamp 512 pulls the lines 12, 13, 14, 15 forward such that the portions of the lines within the draft tube 120 and the dogleg 124 preferably remain substantially taut and preferably remain substantially parallel to the draft tube 120 and the dogleg 124, respectively. For example, the second line portion 12b preferably remains substantially parallel to the draft tube 120 during folding and the third line portion 12c preferably remains substantially parallel to the dogleg 124 during folding. As the dogleg 124 folds forward, the clamp 710 rotates clockwise (as viewed in FIGS. 3 and 10) relative to the dogleg 124, allowing the line 12 to fold into a transport position in which second and third line portions 12b and 12c preferably remain substantially parallel. Because the line 12 does not slide through the clamp 710, as the toolbar 100 folds from the field position to the transport position, the second line portion 12b preferably translates along a direction substantially parallel to the draft tube 120 and toward the dogleg joint 700-2, and the third line portion 12c preferably translates along a direction substantially parallel to the dogleg 124 and away from the dogleg joint 700-2.

As the toolbar 100 unfolds from the transport position to the field position, the clamp 710 pulls the lines 12, 13, 14, 15 outward (to the right as viewed in FIGS. 3 and 10) such that the portions of the lines within the draft tube 120 and the dogleg 124 preferably remain substantially taut and substantially parallel to the draft tube 120 and the dogleg 124, respectively. For example, the second line portion 12b preferably remains substantially parallel to the draft tube 120 during unfolding, and the third line portion 12c preferably remain substantially parallel to the dogleg 124 during unfolding. As the dogleg 124 unfolds rearwardly, the clamp 710 rotates counterclockwise (as viewed in FIGS. 3 and 10) relative to the dogleg 124, allowing the line 12 to unfold into a field position in which second and third line portions 12b and 12c are disposed at an acute relative angle. Because the line 12 does not slide through the clamp 710, as the toolbar 100 unfolds from the transport position to the field position, the second line portion 12b preferably translates along a direction substantially parallel to the draft tube 120 and away from the dogleg joint 700-2 and the third line portion 12c preferably translates along a direction substantially parallel to the dogleg 124 and toward the dogleg joint 700-2.

It should be appreciated that one or more lines mirroring lines 12, 13, 14, 15 described herein on the right side of the toolbar 100 are preferably routed through corresponding components of the left-hand side of the toolbar in an equivalent fashion to that described herein with respect to the right side of the toolbar. In some embodiments the portions of the lines 12, 13, 14, 15 extending along the inner and outer wing sections 130, 110 are in fluid or electrical communication with components mounted to row units (e.g., planter row units) pivotally mounted in transversely spaced relation along the toolbar 100. For example, in embodiments in which the line 12 comprises an electrical lead, the line 12 may place a monitor mounted in the tractor cab such as that disclosed in applicant's co-pending U.S. patent application Ser. No. 13/292,384 (Pub. No. 2012/0050023), incorporated herein by reference, in electrical communication with multiple electrical control modules (e.g., seed meter drive control modules or hydraulic valve control modules) on multiple row units. In embodiments in which the line 12 comprises a hydraulic hose, the line 12 may place a hydraulic port on the tractor (not shown) in fluid communication with hydraulic control valves on multiple row units or with one or more hydraulic control valves mounted to the tool bar.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. An agricultural toolbar movable between a field position and a folded transport position, said toolbar comprising:
    a first bar section;
    a flexible line supported by said first bar section;
    a first pin about which said first bar section pivots, and wherein said first pin moves forward and inward as the toolbar moves from the field position to the folded transport position;
    a first line restraint receiving and constraining said flexible line such that a first portion of said flexible line is constrained to pivot with said first bar section and such that said first portion of said flexible line is caused to move with said first pin as said first pin moves forward and inward as the toolbar moves from the field position to the folded transport position.

2. The agricultural toolbar of claim 1 wherein said line restraint is a clamp mounted to said first pin.

3. The agricultural toolbar of claim 1, further including:
    a second bar section pivotally mounted at a first end to said first bar section about said first pin, such that said first end of said second bar section moves inwardly and forwardly with said first pin as the toolbar moves from the field position and to the transport position, and wherein a second portion of said flexible line is constrained to pivot with said second bar section and is caused to move with said first pin as said first pin moves forward and inward as the toolbar moves from the field position to the folded transport position.

4. The agricultural toolbar of claim 3, wherein in the transport position said first portion of said flexible line is disposed at an obtuse angle relative to said second portion of said flexible line.

5. The agricultural toolbar of claim 4, wherein when said toolbar is in the field position said first portion of said flexible line is disposed at an acute angle relative to said second portion of said flexible line.

6. The agricultural toolbar of claim 3, further including a hitch clamp, wherein said flexible line is constrained by said hitch clamp wherein said hitch clamp retains a tension in said flexible line.

7. The agricultural toolbar of claim 6, wherein said hitch clamp and said first restraint cooperate to constrain said second portion of said flexible line to pivot with said second bar section.

8. The agricultural toolbar of claim 6, wherein said hitch clamp and said first restraint cooperate to constrain said first portion of said flexible line to pivot with said first bar section.

9. The agricultural toolbar of claim 5, wherein a portion of said first portion of said flexible line is housed within said first bar section, and wherein a portion of said second portion of said flexible line is housed within said second bar section.

10. The agricultural toolbar of claim 5, wherein said first bar section comprises a dogleg rigidly mounted to a wing section, wherein a plurality of row units are mounted to said wing section, wherein said wing section is disposed to pivot about a substantially horizontal axis relative to said dogleg.

11. An agricultural toolbar, comprising:
a hitch for mounting the toolbar to a tractor;
a draft tube having a first end and a second end, said draft tube being pivotally mounted at said first end to said hitch for pivoting about a substantially vertical axis relative to said hitch;
a joint mounted to said second end of said draft tube wherein said joint moves relative to said first end of said draft tube as said first end pivots about said substantially vertical axis relative to said hitch; and
a flexible line disposed substantially adjacent to said draft tube;
a line restraint constraining a first portion of said flexible line to move with said joint.

12. The agricultural toolbar of claim 11, wherein said constrained first portion of said flexible line extends substantially parallel to said draft tube and moves with said joint.

13. The agricultural toolbar of claim 12, further comprising:
a wing section pivotally mounted to said draft tube by said joint for pivoting about a substantially vertical axis, wherein a second portion of said flexible line extends substantially parallel to said wing section and is constrained by said line restraint to move with said wing section.

14. The agricultural toolbar of claim 12, wherein said joint is displaced outboard relative to a longitudinal centerline of the toolbar as the toolbar transitions from a transport position to a field position.

15. The agricultural toolbar of claim 14, wherein said constrained first and second portions of said flexible line fold as the toolbar transitions from a transport position to a field position.

16. The agricultural toolbar of claim 15, wherein said constrained first portion of said flexible line is folded at an acute angle relative to said constrained second portion of said flexible line when the toolbar is in said field position.

17. The agricultural toolbar of claim 16, wherein said constrained first portion of said flexible line is at least partially housed within said draft tube.

\* \* \* \* \*